United States Patent
Kim

(10) Patent No.: US 7,009,660 B2
(45) Date of Patent: Mar. 7, 2006

(54) DEVICE AND METHOD FOR AUTOMATICALLY DISCRIMINATING BETWEEN FORMATS OF VIDEO SIGNALS

(75) Inventor: Hak-jae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 493 days.

(21) Appl. No.: 10/093,604

(22) Filed: Mar. 11, 2002

(65) Prior Publication Data
US 2003/0035065 A1 Feb. 20, 2003

(30) Foreign Application Priority Data
Aug. 17, 2001 (KR) ................ 2001-49600

(51) Int. Cl.
*H04N 5/46* (2006.01)
(52) U.S. Cl. ...................... 348/558; 348/180
(58) Field of Classification Search ............ 348/180, 348/184, 558, 554, 555; 324/121 R; 702/57, 702/66, 70, 189
See application file for complete search history.

(56) References Cited

U.S. PATENT DOCUMENTS

| | | | |
|---|---|---|---|
| 5,200,749 A * | 4/1993 | Crosby et al. ................ 341/87 |
| 5,519,440 A * | 5/1996 | Baker ......................... 348/186 |
| 5,790,203 A * | 8/1998 | Maldonado ................. 348/558 |
| 6,310,659 B1 * | 10/2001 | Glen .......................... 348/589 |
| 6,518,744 B1 * | 2/2003 | Tallman et al. ......... 324/121 R |
| 2001/0019365 A1 * | 9/2001 | Kim et al. .................. 348/554 |
| 2002/0105592 A1 * | 8/2002 | Felts et al. .................. 348/554 |

* cited by examiner

Primary Examiner—Victor R. Kostak
(74) Attorney, Agent, or Firm—Robert E. Bushnell, Esq.

(57) ABSTRACT

A device and a method for automatically discriminating formats of video signals input to a monitor and processing the respective signals in accordance with the identified formats are provided. The device automatically identifies whether signals input to the same input port are RGB type PC signals or YPbPr type HDTV signals and processes the signals in accordance with the identified formats. Therefore, users have only to install a single input port commonly used to receive PC signals and HDTV signals rather than installing separate input ports for separately receiving PC signals and HDTV signals.

10 Claims, 3 Drawing Sheets

DEVICE AND METHOD FOR AUTOMATICALLY DISCRIMINATING BETWEEN FORMATS OF VIDEO SIGNALS

CLAIM OF PRIORITY

This application makes reference to, incorporates the same herein, and claims all benefits accruing under 35 U.S.C. §119 from my application Apparatus And Method For Determining A Format Of Video Signal Automatically filed with the Korean Industrial Property Office on Aug. 17, 2001 and there duly assigned Serial No. 49600/2001.

BACKGROUND OF THE INVENTION

1. Field of the Invention

The present invention relates to a device and a method for processing video signals, and more particularly, to a device and a method for automatically discriminating formats of video signals input to a monitor and processing the respective signals in accordance with the identified formats.

2. Description of the Related Art

Monitors adopted in multimedia systems, PCs (Personal Computers), HDTVs (High Definition TVs) and ordinary TVs are connected to respective built-in signal processing devices. The signals output by the signal processing devices are processed in accordance with related formats and then displayed on the monitors.

Existing monitors are equipped with input ports designed to receive the signals output by the signal processing devices. However, various formats of the signals output by the signal processing devices necessitate different kinds of input ports. Therefore, users have to identify the formats of signals input to the monitors and then connect the appropriate input ports of the monitors, which are adapted for the identified formats, to the output ports of the signal processing devices.

Recently, in order to solve the above-described existing problems, new technologies have been developed to identify the frequency of synchronization signals included in the input signals and to discriminate between the formats of the input signals automatically.

It is true that new technologies help to address the existing problems in part. However, the new technologies cannot be perfect solutions since horizontal and vertical synchronization signals of PC (personal computer) signals and HDTV (high definition television) signals may have the same formats not distinguished from each other by the current technologies. That is, the formats of horizontal and vertical synchronization signals in the PC signals and HDTV signals are 31 KHz and 60 Hz respectively, however, the PC signals are represented in RGB form while the HDTV signals in YPbPr form. Thus, the currently developed synchronization signal frequency identification technologies cannot discriminate PC signals from HDTV signals.

Therefore, according to the existing technologies, different input ports for the PC signals and the HDTV signals should be installed on the monitors. Then, users should manually connect the PC signal output port and the HDTV signal output port to respective monitor input ports.

SUMMARY OF THE INVENTION

To solve the above-described problems, it is an object of the present invention to provide a device and method for automatically discriminating between formats of video signals such as PC signals and HDTV signals.

In order to achieve the first objective, a device that automatically discriminates between formats of video signals according to a first embodiment of the present invention includes: a level detector for detecting the level of a video signal input to an input port of the video signal processor; a comparator for comparing the detected level of the video signal detected by the level detector with a pre-determined reference voltage; and a controller for considering the video signal to be a YPbPr type signal if the detected level is determined as being lower than the reference voltage at least a predetermined number of times within a specific section, and if not, considering the video signal to be an RGB type signal.

The automatic video format discrimination method according to the first embodiment includes the steps of: (a) detecting the level of a video signal input to an input port of the video signal processor; (b) comparing the detected level of the video signal with a pre-determined reference voltage; and (c) determining the video signal to be a YPbPr type signal if the detected level is lower than the reference voltage at least a predetermined number of times within a specific section, and if not, determining the video signal to be an RGB type signal.

A device that automatically discriminates the formats of video signals according to a second embodiment of the present invention includes: a clamp unit for generating a clamp signal that has a level corresponding to a clamp control signal from an analog video signal input to an input port; an A/D converter for converting the analog video signal input to the input port into a digital signal based on the clamp signal; a format converter for converting a YPbPr type signal output from the A/D converter into an RGB type signal; a switching unit for receiving a signal output from the format converter and a signal output from the A/D converter and outputting one of the signals selectively depending on a switching control signal; a scaler for compressing or decompressing the RGB type signal from the switching unit to make the RGB type signal suitable for a monitor resolution; and a controller for determining if there are any data within a lower bit area of a signal output from the scaler, wherein if there are not any data within the lower bit area of the signal output from the scaler, the controller determines that the signal from the scaler is the YPbPr type signal, outputs the clamp control signal necessary to generate a middle level clamp signal to the clamp unit, enables the format converter, and outputs the switching control signal in order to make the switching unit output the signal input from the format converter, and if there are data within the lower bit area of the signal output from the scaler, the controller determines that the signal output from the scaler is the RGB type signal.

The automatic video format discrimination method according to the second embodiment includes the steps of: (a) generating a bottom level clamp signal from an analog video signal; (b) converting the analog video signal into a digital signal based on the bottom level clamp signal; (c) inputting the digital signal converted in the step (b) and compressing or decompressing the digital signal to make RGB data that has a resolution suitable for predetermined display formats; and (d) determining the digital signal as a YPbPr type signal if there is no data in a lower bit area of the RGB data in the step (c), and if not, determining the digital signal as an RGB type signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 3A:
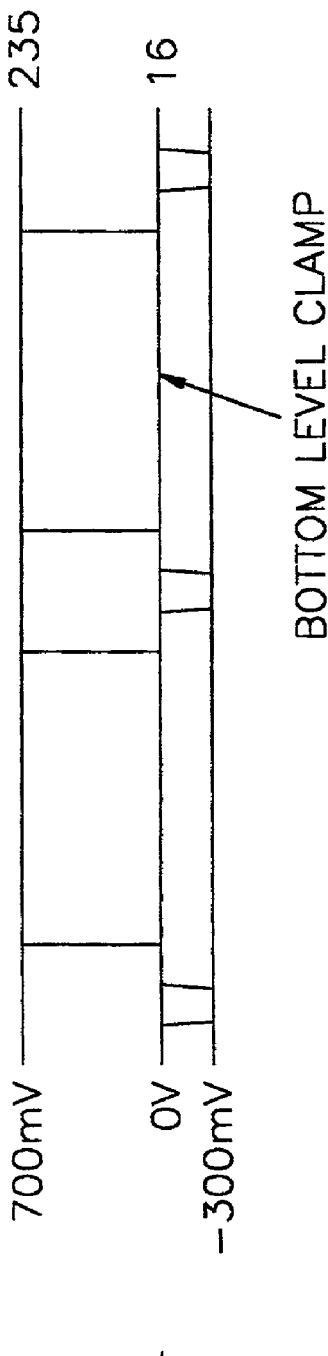
FIG. 3A illustrates RGB type signals and a clamp level.
Figure 3B:
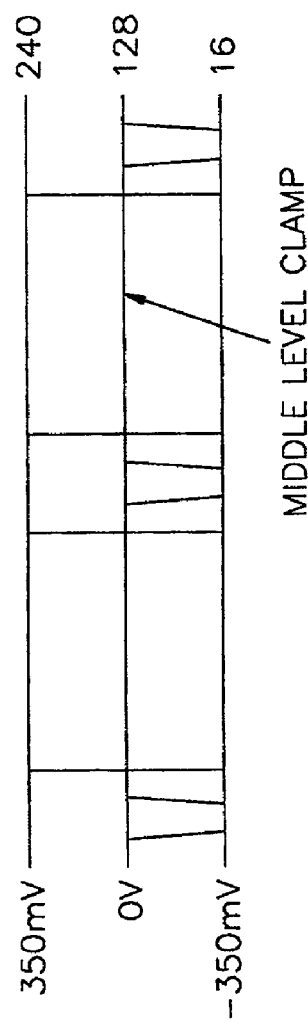
FIG. 3B illustrates YPbPr type signals and a clamp level.

The differences between RGB type signals and YPbPr type signals are described below. FIG. 3A illustrates the RGB type signals while FIG. 3B illustrates YPbPr type signals. As shown in FIGS. 3A and 3B, color signals included in the RGB type signals exist from 0V to 700 mV while color signals included in the YPbPr type signals exist from −350 mV to +350 mV. The amplitude levels of the RGB type signals are set so that a level of 16 is black and a level of 235 is white thus the color data exists between these levels of 16 and 235, and any signal having a level below 16 is deemed blacker than black.

Since color data of RGB type signals exists above 0V (ground voltage), a bottom level clamp is used. Meanwhile, as color data of the YPbPr type signals exists from −350 mV to +350 mV, and color data exists between the amplitude levels of 16 and 240, a middle level clamp is used. If the bottom level clamp is used for the YPbPr type signal, data that exists from 0V to −350 mV, that is, half of all of the data, will be lost. Thus, only data which exists from levels 128 to 240 can be expressed.

The present invention discriminates the RGB type signals from the YPbPr type signals based on the differences between the two type signals.

The present invention to which the above-described principles are applied will be described in detail.

Figure 1:
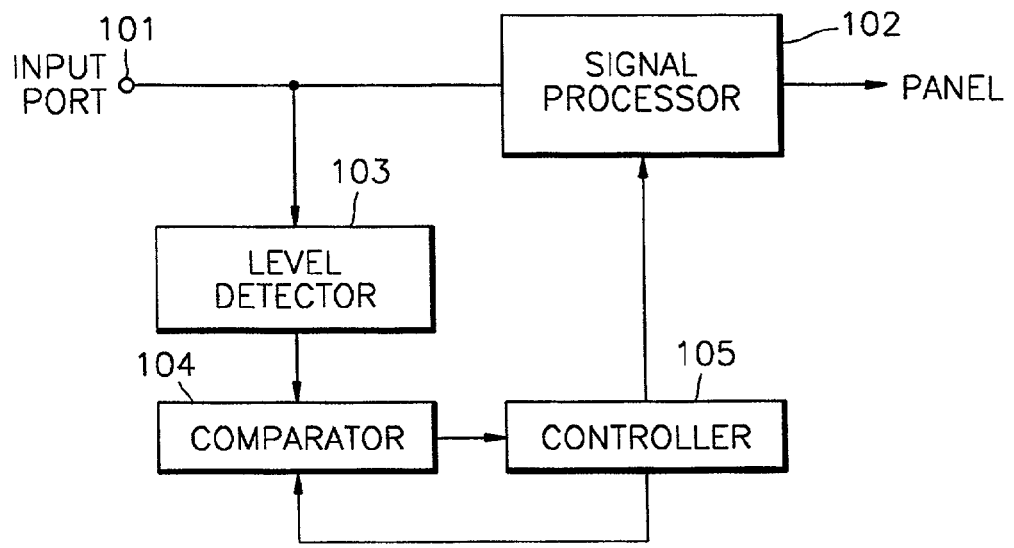
FIG. 1 is a block diagram of a device that automatically discriminates between the formats of video signals according to a first embodiment of the present invention.

As shown in FIG. 1, a device that automatically discriminates between formats of video signals according to a first embodiment of the present invention includes an input port 101, a signal processor 102, a level detector 103, a comparator 104 and a controller 105.

The input port 101 is used to receive a signal to be displayed on the LCD monitor panel. The input port 101 receives an RGB type signal from the output port of a PC or a YPbPr type signal from a HDTV source.

The level detector 103 detects the level of the signal received by the input port 101.

The comparator 104 compares the level of the input signal detected by the level detector 103 with a reference voltage. The reference voltage is used to discriminate the RGB type signal from the YPbPr type signal. For example, in the first embodiment of the present invention, the reference voltage is set to −300 mV. If the level of the detected input signal is lower than that of the reference voltage −300 mV, the comparator 104 sends a "High" (logic level 1) output signal to the controller 105. Meanwhile, if the level of the detected input signal is not lower than that of the reference voltage −300 mV, the comparator 104 sends a "Low" (logic level 0) output signal to the controller 105.

The controller 105 determines signal type after analyzing the comparison result data received from the comparator 104. That is, if all states of the comparison result data received from the comparator 104 are "Low", it means that color signals do not exist below −300 mV. In this case, the video signal is considered as an RGB type signal. If not, the video signal is considered as a YPbPr type signal. It is preferable that the controller 105 is designed to consider the video signal as a YPbPr type signal if the number of times the comparison result data is found to be "High" exceeds a certain number of times within a specific section, while if not, the controller is designed to consider the video signal as an RGB type signal. This will reduce the possibility that the type determination may be wrong due to noise.

The signal processor 102 processes the signal input from the input port 101 in accordance with the signal format determined by the controller 105, and compresses or decompresses the signal to make data suitable for the resolution of the monitor. Then, the signal processor 102 outputs the data to the panel for display.

In accordance with the above-mentioned procedures, it is determined whether the input signal is an RGB type signal from a PC or a YPbPr type signal from a HDTV source.

A device that automatically discriminates between the formats of the video signals according to a second embodiment of the present invention is described below.

Figure 2:
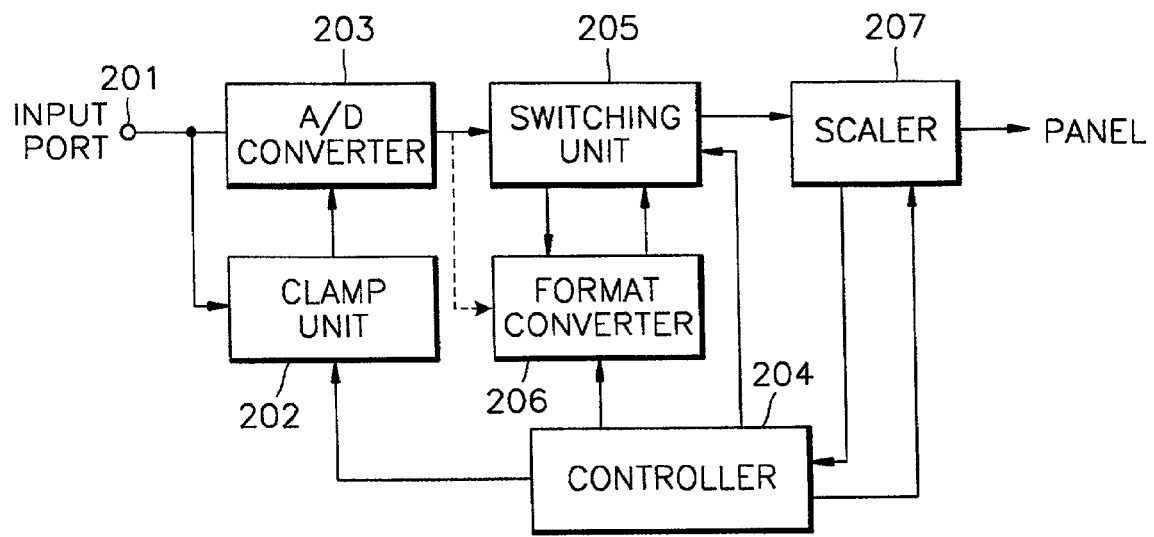
FIG. 2 is a block diagram of a device that automatically discriminates between the formats of video signals according to a second embodiment of the present invention.

As shown in FIG. 2, the device that automatically discriminates the formats of video signals according to the second embodiment of the present invention includes an input port 201, a clamp unit 202, an A/D converter 203, a controller 204, a switching unit 205, a format converter 206 and a scaler 207.

The input port 201 is used to receive a signal to be displayed on an LCD monitor panel. The input port 201 receives an RGB type signal from a PC or a YPbPr type signal from a HDTV source.

The clamp unit 202 generates clamp signals to be used as reference level signals when converting the analog signals into digital data. As shown in FIGS. 3A and 3B, the clamp unit 202 generates a bottom level clamp signal which uses the bottom level as a pedestal level for the RGB type signal. Meanwhile, the clamp unit 202 generates a middle level clamp signal which uses the middle level as a pedestal level for the YPbPr type signal. The clamp unit 202 generates the bottom level clamp signal or the middle level clamp signal depending on a clamp control signal sent by the controller 204. The controller 204 generates the clamp control signal so that the bottom level clamp signal can be generated in the default mode.

Therefore, in the default mode, the clamp unit 202 outputs the bottom level clamp signal to the A/D converter 203. The A/D converter 203 converts the input signal into digital data based on the bottom level clamp signal. If the input signal is the YPbPr type signal, the signal below the bottom level is lost in the default mode.

The A/D converter is preferably designed to perform A/D conversion using a look-up table (not shown) in which digital data corresponding to voltage values are stored. The A/D converter 203 sets a reference value to a DC voltage level during the A/D conversion by using the clamp signal output from clamp unit 202 in order to prevent a change of data value according to the difference in a DC voltage level of an input signal.

For the RGB type signals, a pedestal level is set as a bottom level, and a bottom level clam signal for performing A/D conversion is used. For the YPbPr type signals a pedestal level is set as a middle level, and a middle level clamp signal for performing A/D conversion is used. That is, as shown in FIG. 3A, in a bottom level clamp mode, the look-up table is controlled such that 16, which is the minimum value of the digital data, corresponds to a sampling reference voltage of 0 volts and the digital data output by A/D converter 230 will range between the values 16 and 235.

In the middle level clamp mode, the look-up table is controlled such that 128, which is the middle level of the digital data, corresponds to the sampling reference voltage of 0 volts and the digital data output by A/D converter 230 will range between the values 16 and 128 for input signals having a voltage range between −350 mV and 0V, and between 128 and 240 for input signals having a voltage range between 0V and +350 mV, as shown in FIG. 3B.

Thus if the sampled value is 0 volts, the value of the digital value differs depending on whether the clamp mode is the bottom level clamp mode or the middle level clamp mode. Note that each component of the input signal, RGB or YPbPr, will, of course, require its own corresponding separate A/D converter.

The switching unit 205 outputs the signal received from the A/D converter 203 or the signal received from the format converter 206, selectively, depending on a switching control signal. In the default mode, the controller 204 generates a switching control signal used to select and output the signal received from the A/D converter 203. It should be understood that the signal from A/D converter 203 can be switched by switching unit 205 to be input to format converter 206 or, as shown by the dotted line, can be directly input to format converter 206.

The format converter 206 converts the YPbPr type signal received from the A/D converter 203 into the RGB type signal. The format converter 206 is designed to be disabled in the default mode and to be enabled when the input signal is found to be a YPbPr type signal.

The scaler 207 compresses or decompresses the RGB type signal to make the signal suitable for the display resolution of the monitor, and outputs the signal.

Therefore, if the input port 201 receives the RGB type signal in the default mode, the signal is processed normally and displayed on the panel through the scaler 207.

Meanwhile, if the YPbPr type signal is input to the input port 201, half of the data, which is below the bottom level, will be lost due to the bottom level clamp signal. As a result, no data exists in the lower bit area of the RGB data in the scaler 207.

The controller 204 monitors this lower bit data of the RGB signal in the scaler 207. If "Low" output signals are found consecutively in a specific section, i.e., a predetermined area of a frame, the controller 204 considers the signal as the YPbPr type signal transmitted by the HDTV. Then, the controller 204 outputs the clamp control signal, necessary to generate the middle level clamp signal suitable for processing the YPbPr type signal, to the clamp unit 202, generates the control signal to enable the format converter 206 and generates a switching control signal so that the switching unit 205 can output the signal from the A/D converter 203 to the format converter 206 and then to the scaler 207.

If the controller 204, monitoring the lower bit data of the RGB signal in the scaler 207, finds that there are no consecutive "Low" output signals in a specific section, it considers the signal as the RGB type signal transmitted by the PC and maintains the default mode.

In the procedure described above, the device for automatically discriminating between the formats of video signals can determine whether a signal input to the same input port is an RGB type PC signal or a YPbPr type HDTV signal. In addition, the device can process the input signals in accordance with the discriminated formats.

Especially, the combination of devices according to the first embodiment of the present invention and the second embodiment of the present invention helps to find more accurately the formats of the video signals.

Figure 4:
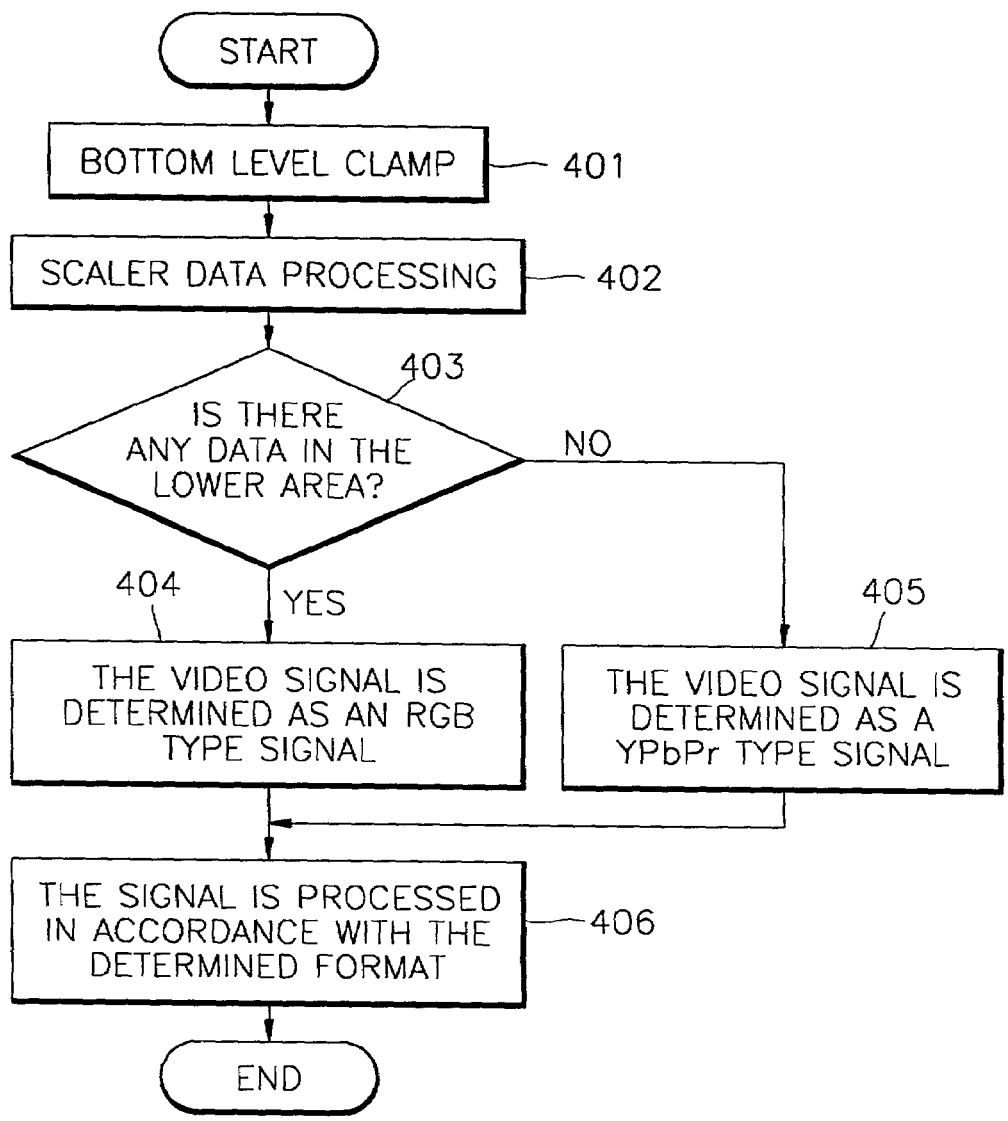
FIG. 4 is a flow chart illustrating a method of automatically discriminating between the formats of the video signals according to the second embodiment of the present invention.

Lastly, FIG. 4 is a flow chart view showing a method of automatically discriminating between the formats of the video signals according to the second embodiment of the present invention.

In step 401, a bottom level clamp signal is generated by a clamp unit to clamp the analog video signal input to the input port because the signal processor is designed to process RGB type signals in an initial (default) mode.

In step 402, the analog video signal input to the input port is converted into the digital video signal by an A/D converter based on the bottom level clamp signal produced in step 401. Then, a scaler compresses or decompresses the digital video signal, and if the digital video signal is an RGB digital signal, the scaler outputs RGB data suitable for the resolution of a monitor. If the digital video signal is not an RGB digital signal, but is instead a YPbPr digital video signal, the scaler outputs data unsuitable for the resolution of a monitor.

In step 403, a controller determines whether any data exists in an area from the least significant bit to the middle bit, i.e., the lower bit area, of the data output from the scaler. The controller expects to receive data in the lower bit area of RGB data expected to be output from the scaler.

If the controller finds in step 403 that there is data in the lower bit area of the data output from the scaler, this means the bottom clamp signal does not affect the loss of the data. Therefore, the controller determines the signal to be an RGB type PC signal in step 404.

If the controller finds in step 403 that there is no data in the lower bit area of the data output from the scaler, this means the bottom clamp signal causes the half of the data to be lost. Therefore, the controller determines the signal to be a YPbPr type HDTV signal in step 405.

In step 406, the input analog signal is processed in accordance with the signal type format determined in steps 404 and 405. That is, if it is found that the signal is the RGB type, the default mode is maintained.

Meanwhile, if the signal is found to be the YPbPr type signal, the control signals suitable for processing the YPbPr type signal are generated, i.e., the controller outputs a clamp control signal to the clamp unit which generates a middle level clamp signal for the A/D converter suitable for processing the YPbPr type signal, generates a control signal to enable a format converter for converting the YPbPr digital signal to an RGB digital signal and generates a switching control signal so that a switching unit can output the signal from the format converter to the scaler. The scaler then outputs RGB data suitable for the resolution of the monitor.

In the procedure described above, the device for automatically discriminating the formats of video signals can determine whether the signals input to the same input port are RGB type PC signals or YPbPr type HDTV signals. In addition, the device can process the input signals in accordance with the discriminated formats.

As described above, the present invention automatically identifies if signals input to the same input port are RGB type PC signals or YPbPr type HDTV signals and processes the signals in accordance with the identified formats. Therefore, users have only to install a common connector used to receive both the PC signals and the HDTV signals and to output the received signals to a single input port of the present invention, rather than installing separate input ports for the PC signals and the HDTV signals. Moreover, the present invention frees users from verifying the input signals coming from a PC or a HDTV in order to connect input ports of the monitor with output ports of a signal processor.

The present invention can be realised in the form of a method, a device or a system. If the invention is executed as software, code segments for essential tasks are incorporated in the invention. Programs or code segments can be stored in processor-readable media and transmitted as computer data signals combined with carriers in transmission media or communication networks.

The processor-readable media refer to any media that can store or transmit information, including electronic circuits, semiconductor memory devices, ROMs, flash memories, Erasable ROMs (EROMs), floppy disks, optical disks, hard disks, optical fibre media and Radio Frequency (RF) networks. The computer data signals include signals that can propagate over transmission media such as electronic network channels, optical fibre, air, electromagnetic fields and RF networks.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A device for automatically discriminating between formats of video signals for use in a video signal processor, the automatic video signal format discrimination device comprising:
   a level detector for detecting the level of a video signal input to an input port of the video signal processor;
   a comparator for comparing the video signal detected by the level detector with a predetermined reference voltage; and
   a controller for considering the video signal as a YPbPr type signal if the detected level is determined as being lower than the reference voltage at least predetermined number of times within a specific section, and if not, considering the video signal as an RGB type signal.

2. The device of claim 1, wherein the reference voltage is set to 0 volts.

3. A device for automatically discriminating between formats of video signals for use in a video signal processor, the automatic video signal format discrimination device comprising:
   a clamp unit for generating a clamp signal that has a level corresponding to a clamp control signal from an analog video signal input to an input port;
   an A/D converter for converting the analog video signal input to the input port into a digital signal based on the clamp signal;
   a format converter for converting a YPbPr type signal output from the A/D converter into an RGB type signal;
   a switching unit for receiving a signal output from the format converter and a signal output from the A/D converter and outputting one of the signals selectively depending on a switching control signal;
   a scaler for compressing or decompressing the RGB type signal from the switching unit to make the RGB type signal suitable for a monitor resolution; and
   a controller for determining if any data exists within a lower bit area of a signal output from the scaler, wherein if no data exists within the lower bit area of the signal output from the scaler, the controller determines that the signal from the scaler is the YPbPr type signal, outputs a clamp control signal necessary to generate a middle level clamp signal to the clamp unit, enables the format converter, and outputs the switching control signal in order to make the switching unit output the signal input thereto from the format converter, and if there are data within the lower bit area of the signal output from the scaler, the controller determines that the signal output from the scaler is the RGB type signal.

4. The device of claim 3, wherein the clamp unit is designed to generate a bottom level clamp signal in a default mode.

5. The device of claim 3, wherein the controller determines if there are any data within a predetermined area of a frame.

6. The device of claim 3, wherein the lower bit area is from a least significant bit to a middle bit.

7. A method for automatically discriminating between formats of video signals for use in a video processing method, the automatic video format discrimination method comprising the steps of:
   (a) generating a bottom level clamp signal from an analog video signal;
   (b) converting the analog video signal into a digital signal based on the bottom level clamp signal;
   (c) inputting the digital signal converted in the step (b) and compressing or decompressing the digital signal to produce data that has a resolution suitable for predetermined display formats, wherein data that has a resolution suitable for predetermined display formats is RGB data; and
   (d) determining the digital signal to be a YPbPr type signal if there is no data in a lower bit area of the produced data in the step (c);
   (e) determining the digital signal to be an RGB type signal if there is data in the lower bit area of the produced data in the step (c); and
   (f) processing the analog video signal according to a bottom level clamp mode in response to step (e) and according to a middle level clamp mode in response to step (d).

8. The method of claim 7, wherein the lower bit area is from a least significant bit to a middle bit.

9. The method of claim 7, the step of processing the analog video signal according to the middle level clamp mode comprising steps of:
   (g) generating a clamp control signal, said clamp control signal being applied to a clamp unit which generates a middle level clamp signal;
   (h) converting the analog video signal into a digital signal based on the middle level clamp signal;
   (i) generating a control signal to enable a format converter for converting the YPbPr digital signal to an RGB digital signal;
   (j) compressing or decompressing the RGB digital signal of step (i) to produce the RGB data suitable for the predetermined display formats.

10. The method of claim 7, the step of processing the analog video signal according to the bottom level clamp mode comprising a steps of returning to step (a).

* * * * *